(12) United States Patent
Porat

(10) Patent No.: US 9,407,402 B2
(45) Date of Patent: Aug. 2, 2016

(54) OFDMA COMMUNICATIONS FOR MULTIPLE CAPABILITY WIRELESS COMMUNICATION DEVICES

(71) Applicant: BROADCOM CORPORATION, Irvine, CA (US)

(72) Inventor: Ron Porat, San Diego, CA (US)

(73) Assignee: BROADCOM CORPORATION, Irvine, CA (US)

(*) Notice: Subject to any disclaimer, the term of this patent is extended or adjusted under 35 U.S.C. 154(b) by 119 days.

(21) Appl. No.: 14/303,701

(22) Filed: Jun. 13, 2014

(65) Prior Publication Data

US 2014/0369333 A1 Dec. 18, 2014

Related U.S. Application Data

(60) Provisional application No. 61/834,819, filed on Jun. 13, 2013.

(51) Int. Cl.
*H04L 5/00* (2006.01)
*H04L 27/26* (2006.01)

(52) U.S. Cl.
CPC ............ *H04L 5/0007* (2013.01); *H04L 5/0048* (2013.01); *H04L 27/2613* (2013.01); *H04L 5/006* (2013.01); *H04L 5/0023* (2013.01)

(58) Field of Classification Search
CPC ..... H04L 5/0007; H04L 5/0023; H04L 5/0048; H04L 5/006; H04L 27/2613
See application file for complete search history.

(56) References Cited

U.S. PATENT DOCUMENTS

| 9,113,490 B2* | 8/2015 | Porat | H04W 72/1231 |
| 2004/0258025 A1* | 12/2004 | Li | H04L 1/0059 370/334 |
| 2005/0271174 A1* | 12/2005 | DiRenzo | H04L 1/06 375/354 |

* cited by examiner

*Primary Examiner* — Jianye Wu
(74) *Attorney, Agent, or Firm* — Garlick & Markison; Shayne X. Short

(57) ABSTRACT

A communication device's processor generates an OFDMA packet that includes different information for different recipient devices. The processor transmits, via a communication interface, different portions of the OFDMA packet via different channels. Initially, the processor transmits a first at least one field of the OFDMA packet intended for a first recipient device via the first channel. Then, the processor transmits a second at least one field of the OFDMA packet intended for the first recipient device via the first channel while simultaneously transmitting at least one other field of the OFDMA packet intended for a second recipient device via a second channel. This staggered transmission of different portions of the OFDMA packet via different channels allows a recipient device to classify different portions of the OFDMA packet and to determine which portions are intended for that recipient device.

20 Claims, 9 Drawing Sheets

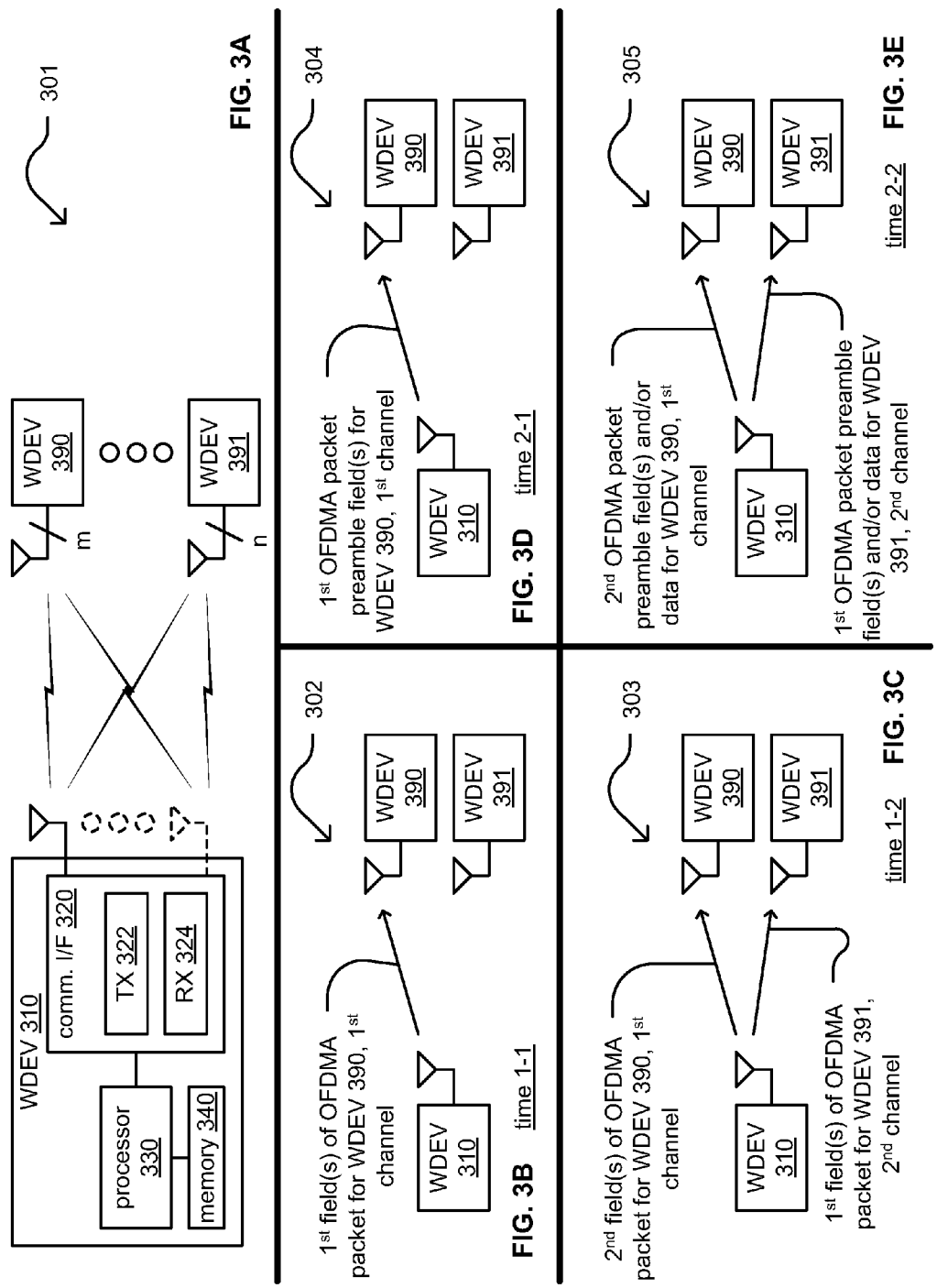

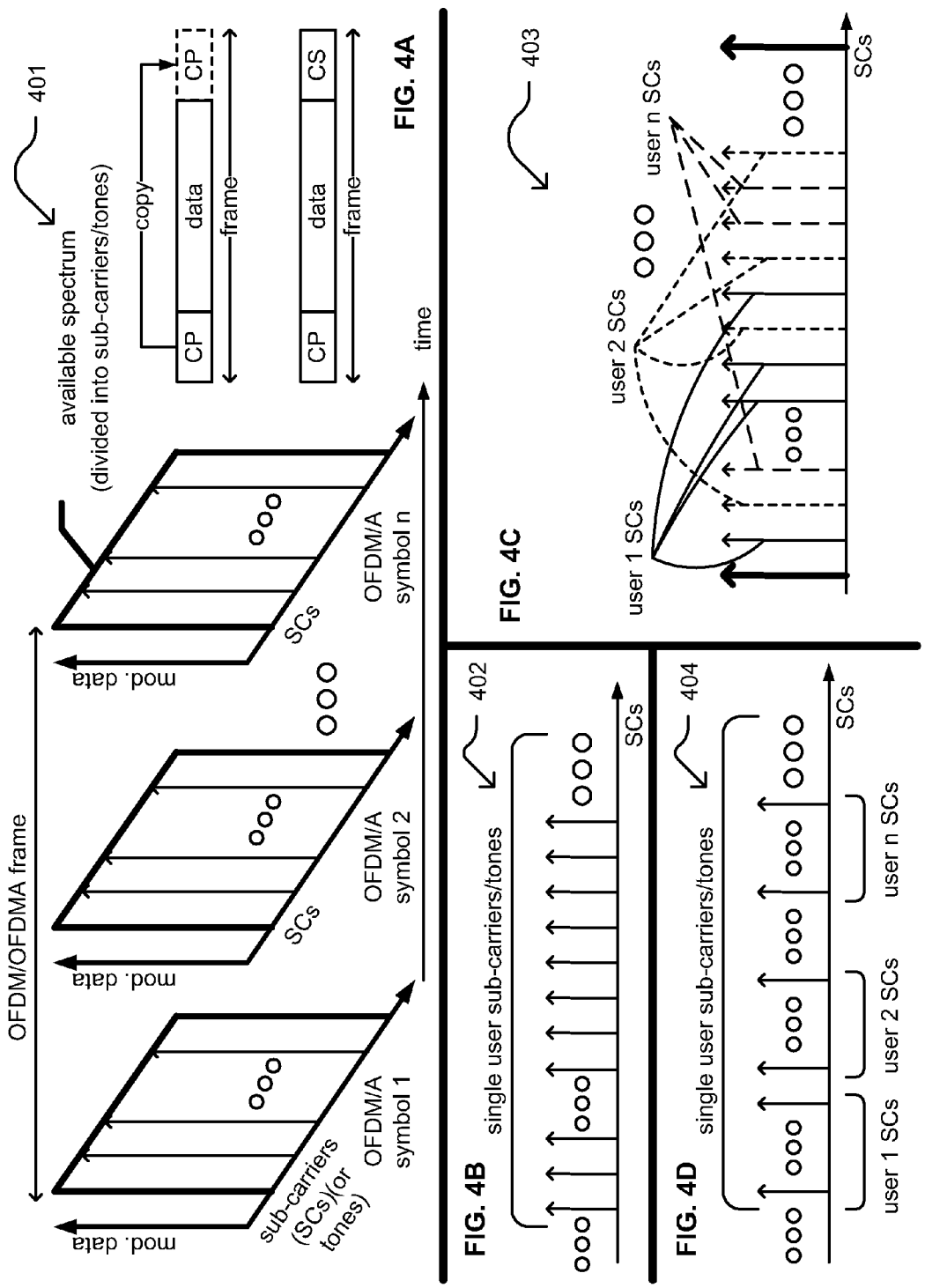

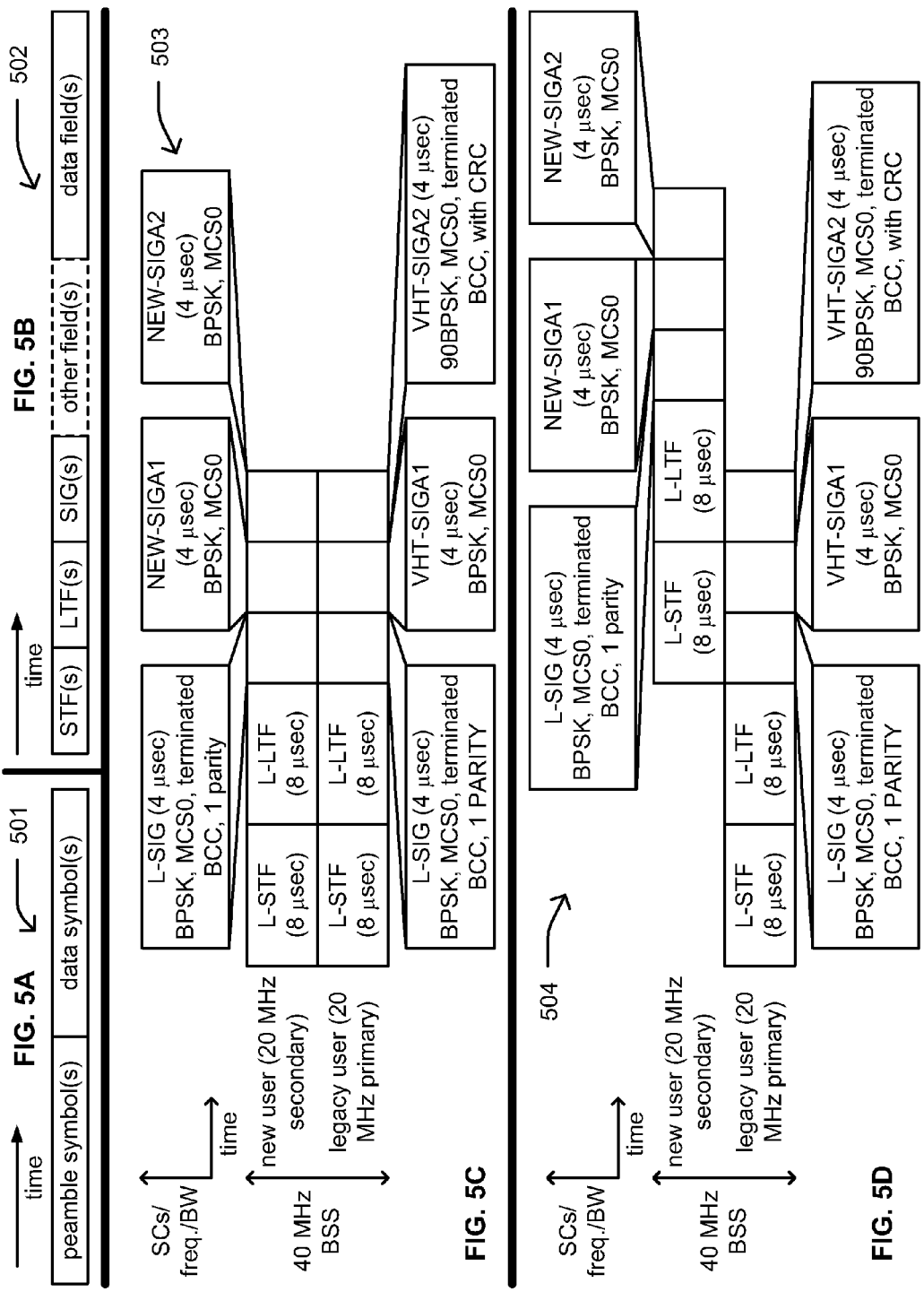

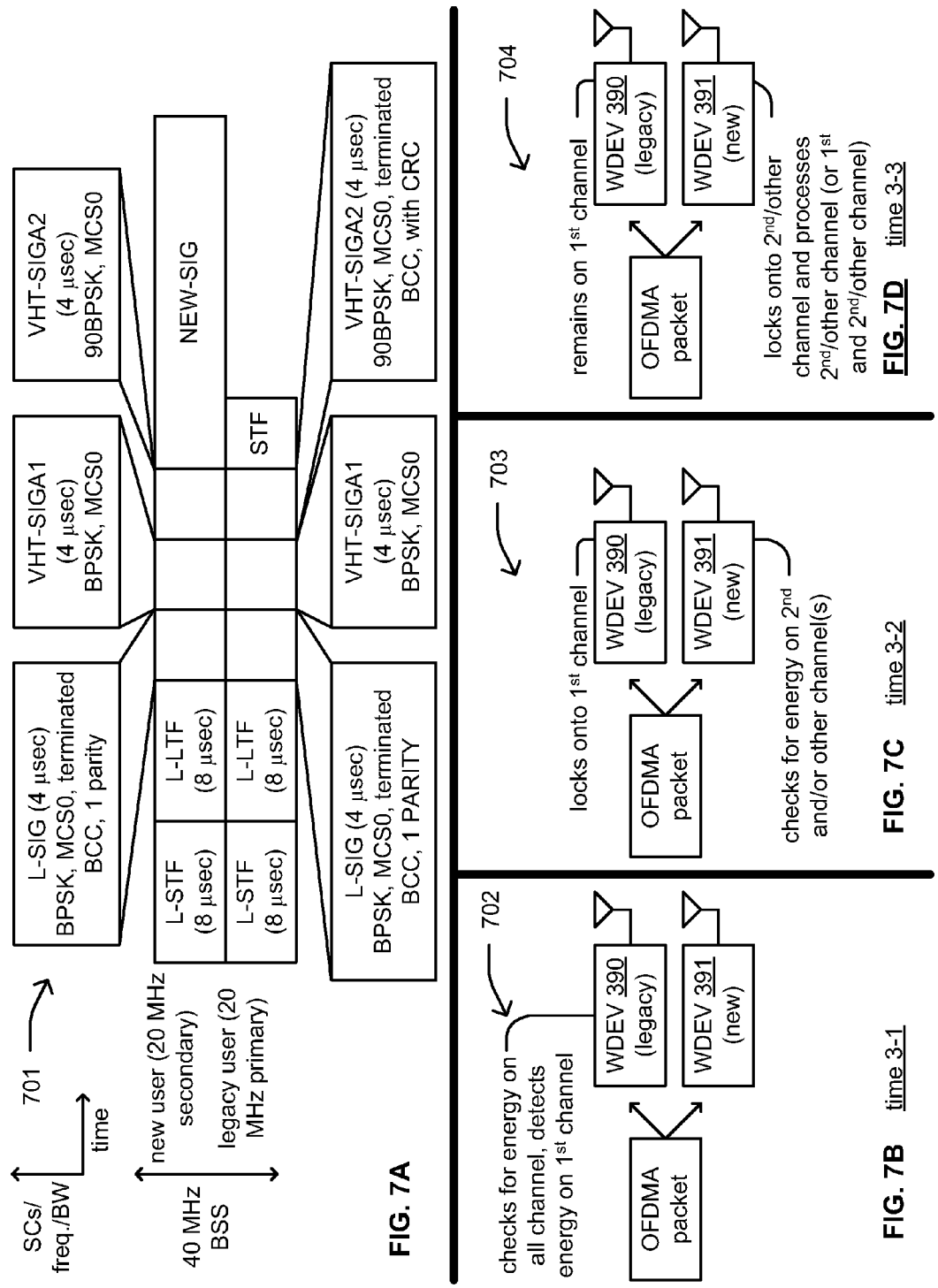

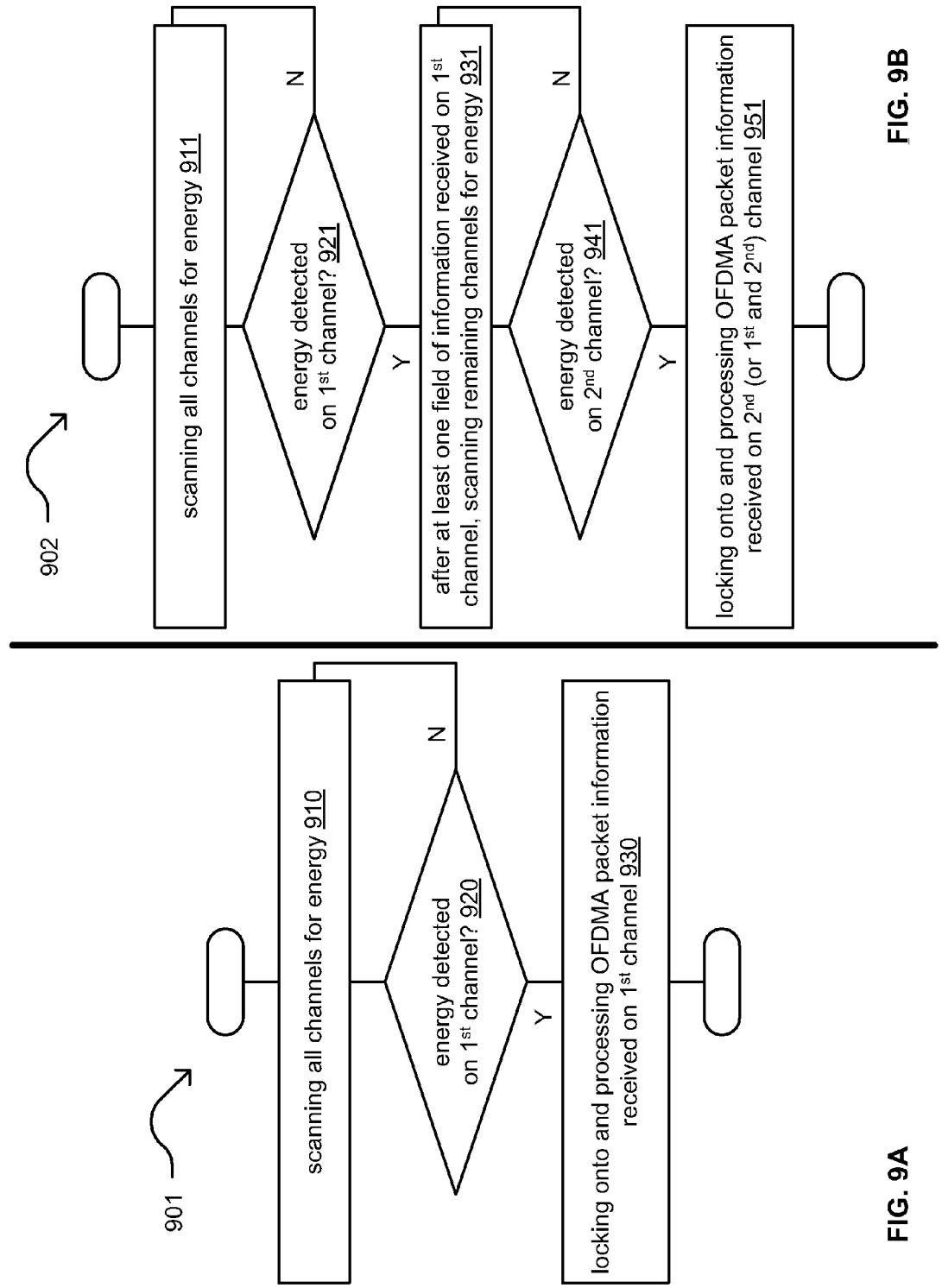

OFDMA COMMUNICATIONS FOR MULTIPLE CAPABILITY WIRELESS COMMUNICATION DEVICES

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional App. No. U.S. 61/834,819, entitled "Downlink (DL) orthogonal frequency division multiple access (OFDMA) with legacy users for high efficiency wireless communications," filed Jun. 13, 2013, which is hereby incorporated herein by reference in its entirety and made part of the present U.S. Utility Patent Application for all purposes.

BACKGROUND

1. Technical Field

The present disclosure relates generally to communication systems; and, more particularly, to multi-communication device based communications within single user, multiple user, multiple access, and/or MIMO wireless communications.

2. Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

In some applications, different devices may operate based on two or more different communication standards, protocols, and/or recommended practices. In such situations, a device should be implemented to distinguish among transmissions that comply with the different communication standards, protocols, and/or recommended practices and to process them accordingly. As additional and new communication standards, protocols, and/or recommended practices continue to be developed, the prior art does not provide an adequate means by which such differentiation and distinction may be made.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 3D is a diagram illustrating another example of communication between wireless communication devices.

FIG. 3E is a diagram illustrating another example of communication between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 5A is a diagram illustrating an example of an OFDM and/or OFDMA packet.

FIG. 5B is a diagram illustrating another example of an OFDM and/or OFDMA packet.

FIG. 5C is a diagram illustrating an example of a preamble of an OFDMA packet.

FIG. 5D is a diagram illustrating another example of a preamble of an OFDMA packet.

FIG. 7A is a diagram illustrating another example of a preamble of an OFDMA packet.

FIG. 7B is a diagram illustrating another example of communication between wireless communication devices.

FIG. 7C is a diagram illustrating another example of communication between wireless communication devices.

FIG. 7D is a diagram illustrating another example of communication between wireless communication devices.

FIG. 9A is a diagram illustrating an embodiment of a method for execution by at least one wireless communication device.

FIG. 9B is a diagram illustrating an embodiment of another method for execution by at least one wireless communication device.

DETAILED DESCRIPTION

Figure 1:
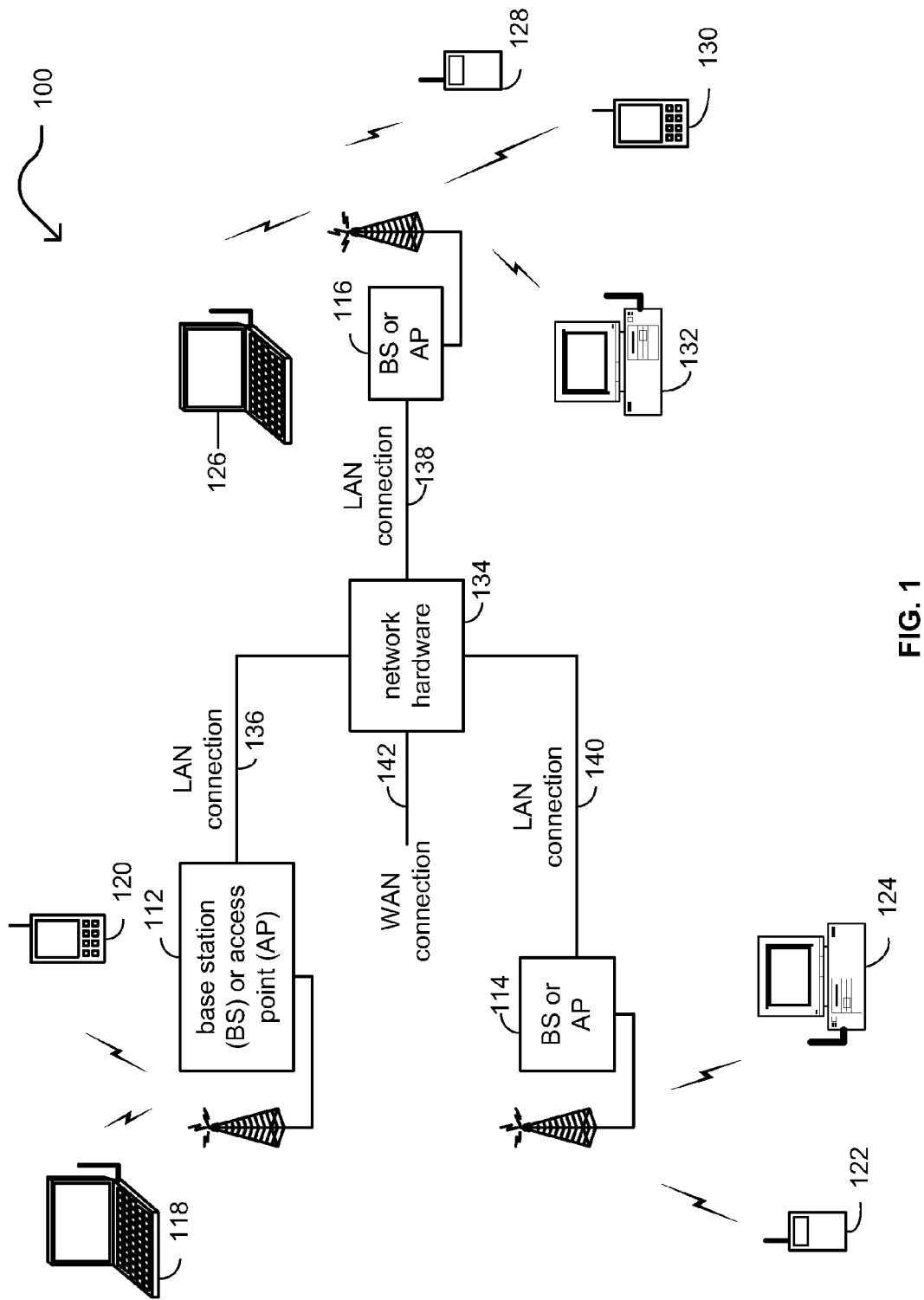
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391).

The processor of any one of the various devices, WDEVs 118-132 and BSs or APs 112-116, may be configured to support communications via at least one communication interface with any other of the various devices, WDEVs 118-132 and BSs or APs 112-116. Such communications may be uni-directional or bi-directional between devices. Also, such communications may be uni-directional between devices at one time and bi-directional between those devices at another time.

Generally speaking, any of the various devices (e.g., WDEVs 118-132 and BSs or APs 112-116) may be configured to support communications based on at least one communication standard, protocol, and/or the recommended practice. In some instances, a given device may be configured to support communications based on only one communication standard, protocol, and/or recommended practice. A device is configured to generate an orthogonal frequency division multiple access (OFDMA) packet that includes information for two or more recipient devices. For example, a device may include a processor that is configured to generate an OFDMA packet that includes first at least one field intended for first other wireless communication device and second at least one field intended for second other wireless communication device. The processor may also be configured to transmit, via a communication interface of that device, the first at least one field of the OFDMA packet via first channel and to transmit, via the communication interface, the second at least one field of the OFDMA packet via second channel after at least one of the first at least one field has been transmitted and simultaneously transmit at least one other field via the first channel. The first and second channels may be composed of first and second sub-carriers used for OFDMA signaling. For example, a first channel may be composed of first at least one sub-carrier, and a second channel may be composed of second at least one sub-carrier.

In another example operation, the processor is configured to generate the OFDMA packet to include first data for the first other wireless communication device and second data for the second other wireless communication device. The processor is then configured to transmit, via the communication interface, the OFDMA packet that includes the first data for the first other wireless communication device via the first channel after the at least one of the first at least one field has been transmitted and simultaneously transmit the second data for the second other wireless communication device via the second channel.

The processor may be configured to generate different OFDMA packets of different forms or structures at different times. For example, a general format of an OFDMA packet may include at least one short training field (STF), at least one long training field (LTF), at least one signal field (SIG) implemented within a preamble of the OFDMA packet followed by at least one data field or payload of the OFDMA packet. The processor may select a particular OFDMA packet structure based on one or more considerations (e.g., the recipient devices to which the OFDMA packet is to be transmitted including their respective communication protocol capabilities, the amount and type of data to be included within the OFDMA packet, etc.).

In another example operation, the processor is configured to transmit, via the communication interface, different portions of the OFDMA packet via a first or primary channel and a second or secondary channel. The bandwidth of the different channels may be the same or different. For example, the bandwidth of the primary and secondary channels may be 20 MHz each within a 40 MHz basic services set (BSS). In another example, the bandwidth of the primary and secondary channels may be any possible selected bandwidth defined within one or more communication standards, protocols, and/or recommended practices, including those based on at least one type of IEEE 802.11x communication protocol (e.g., where x is a, b, g, n, ac, ad, af, ah, ax, and/or any other extension etc.). Different portions of the OFDMA packet that are transmitted via different channels may correspond to different IEEE 802.11 communication protocols. A first IEEE 802.11 communication protocol may be a legacy protocol with respect to a second IEEE 802.11 communication protocol, and the second IEEE 802.11 communication protocol may be backwards compatible with the first IEEE 802.11 communication protocol.

Figure 2:
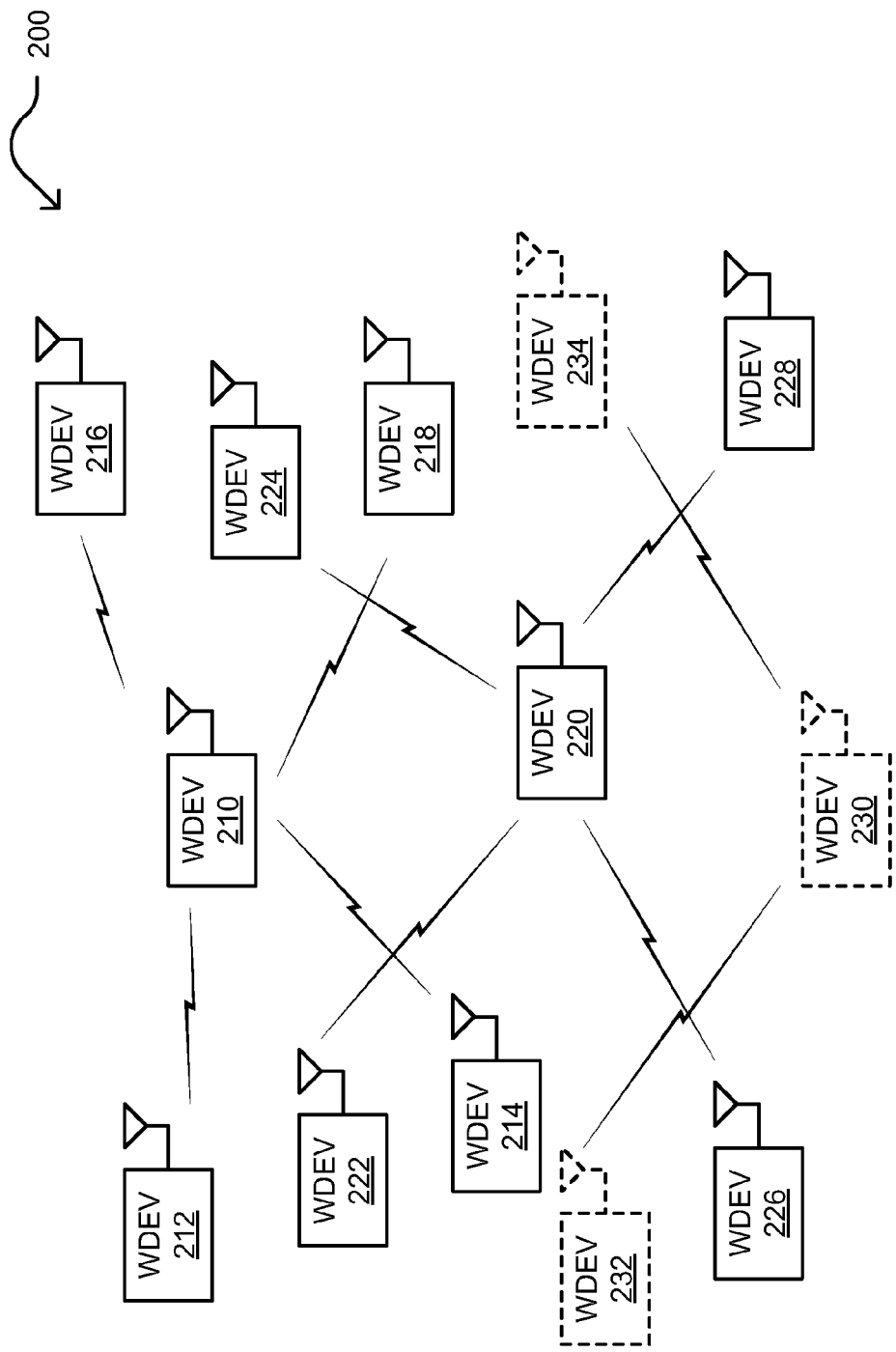
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

Any one of the various WDEVs 210-234 may be implemented to include a processor and a communication interface to generate, process, interpret, and transmit OFDMA packets for transmission to and/or reception from other of the WDEVs 210-234. For example, a device may include a processor configured to generate an OFDMA packet that includes first at least one field intended for first other wireless communication device and second at least one field intended for second other wireless communication device. The processor is also configured to transmit, via the communication interface, the first at least one field of the OFDMA packet via first channel and to transmit, via the communication interface, the second at least one field of the OFDMA packet via second channel after at least one of the first at least one field has been transmitted and simultaneously transmit at least one other field via the first channel Note that the processor initially transmits via only the first channel, and then transmits via both the first and second channels. The transmissions made via the respective channels may correspond, at least in part, to different communication protocols, standards, and/or recommended practices. The staggering of transmission via the first and second channels allows recipient devices to distinguish those portions of the OFDMA packet and to process them appropriately. For example, the transmission made initially via the first channel may correspond to a first communication protocol that is legacy with respect to a second transmission protocol associated with the transmission subsequently made via the second channel.

Within an application such as that described with respect to embodiment 200 of dense deployment of wireless communication devices, there may be a number of different devices of different capabilities including abilities to support communications based on different communication protocols, standards, and/or recommended practices. Appropriate signaling can allow the different devices to classify transmissions and process them appropriately.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably). The wireless communication device 310 also includes a processor 330, and an associated memory 340, to execute various operations including interpreting at least one packet or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include more than one antenna for transmitting and receiving of at least one packet or frame (e.g., WDEV 390 may include m antennae, and WDEV 391 may include n antennae).

In an example of operation, processor 330 is configured to generate an OFDMA packet that includes first at least one field intended for first other wireless communication device (e.g., device 390) and second at least one field intended for second other wireless communication device (e.g., device 391). Processor 330 is also configured to transmit, via the communication interface 320, the first at least one field of the OFDMA packet via first channel and to transmit, via the communication interface 320, the second at least one field of the OFDMA packet via second channel after at least one of the first at least one field has been transmitted and simultaneously transmit at least one other field via the first channel.

The OFDMA packet may include additional information such as first data for device 390 and second data for device 391. In such an instance, the processor 330 is configured to transmit, via the communication interface 320, the first data for the device 390 via the first channel after the at least one of the first at least one field has been transmitted and simultaneously transmit second data for the device 391 via the second channel. The OFDMA packet may be of any of a number of different forms. In one example of an OFDMA packet, the first at least one field includes first short training field (STF) followed by first long training field (LTF) followed by at least one first signal field (SIG), and the second at least one field includes second STF followed by second LTF followed by at least one second SIG. In another example of an OFDMA packet, the first at least one field includes short training field (STF) followed by first long training field (LTF) followed by at least one first signal field (SIG), the second at least one field includes second LTF followed by at least one second SIG and excludes any STF, and the STF is intended for both the first and second other wireless communication devices. In certain instances, the different STFs, LTFs, SIGs, etc. that are transmitted via the different respective channels correspond to different IEEE 802.11 communication protocols.

FIG. 3B is a diagram illustrating another example 302 of communication between wireless communication devices. The processor 330 of WDEV 310 is configured to transmit, via communication interface 320, a first portion of an orthogonal frequency division multiple access (OFDMA) packet to other wireless communication devices WDEVs 390 and 391 (e.g., other WDEVs) at or during a first time (time 1-1). In this example 302, which can be considered in conjunction with example 303 of FIG. 3C, the first portion of the OFDMA packet includes at least one first field intended for device 390 and is transmitted via first channel composed of first at least one sub-carrier.

FIG. 3C is a diagram illustrating another example 303 of communication between wireless communication devices. The processor 330 of WDEV 310 is configured to transmit, via communication interface 320, a second portion of the OFDMA packet to the other wireless communication devices WDEVs 390 and 391 (e.g., other WDEVs) at or during a second time (time 1-2). In this example 303, which can be considered in conjunction with example 302 of FIG. 3B, the second portion of the OFDMA packet includes at least one second field intended for device 390 that is transmitted via first channel composed of first at least one sub-carrier and also includes at least one first field intended for device 391 that is transmitted via second channel composed of second at least one sub-carrier. In this example 303, different portions of the OFDMA packet intended for each of the devices 390 and 391 are transmitted simultaneously and via different channels. In one implementation of examples 302 and 303, the transmission in example 302 is the only transmission made initially and only via one channel and is followed by simultaneous transmission via two channels. The staggered transmission via different channels (e.g., initially via only the first channel and subsequently via both the first and second channels) allows the recipient devices 390 and 391 to distinguish different portions of the OFDMA packet and to determine on which channel they should lock onto and monitor.

FIG. 3D is a diagram illustrating another example 304 of communication between wireless communication devices. The processor 330 of WDEV 310 is configured to transmit, via communication interface 320, a first portion of an OFDMA packet to other wireless communication devices WDEVs 390 and 391 (e.g., other WDEVs) at or during a first time (time 2-1). In this example 304, which can be considered in conjunction with example 305 of FIG. 3E, the first portion of the OFDMA packet includes at least one first preamble field intended for device 390 and is transmitted via first channel composed of first at least one sub-carrier.

FIG. 3E is a diagram illustrating another example 305 of communication between wireless communication devices. The processor 330 of WDEV 310 is configured to transmit, via communication interface 320, a second portion of the OFDMA packet to the other wireless communication devices WDEVs 390 and 391 (e.g., other WDEVs) at or during a second time (time 2-2). In this example 305, which can be considered in conjunction with example 304 of FIG. 3D, the second portion of the OFDMA packet includes at least one second preamble field and/or data intended for device 390 that is transmitted via first channel composed of first at least one sub-carrier and also includes at least one first preamble field and/or data intended for device 391 that is transmitted via second channel composed of second at least one sub-carrier. Note that the transmission in example 304 is made via only the first channel, and the transmissions in example 305 are made simultaneously and as via both the first and second channels.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users.

For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or super-frame (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. This example 404 where the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

Note that any desired grouping of one or more sub-carriers may form a channel. In certain applications, adjacently located sub-carriers that span different portions of an available bandwidth (e.g., 20 MHz channels within a bandwidth specified by a BSS) form different respective channels. As an example, a first channel may be composed of first adjacently located sub-carriers that span a first 20 MHz bandwidth, and a second channel may be composed of second adjacently located sub-carriers that span a second 20 MHz bandwidth, and the first and second channels may be adjacently located next to one another. In other examples, a first channel may be composed of first one or more selected sub-carriers, whether they are adjacently located or not, and a second channel may be composed of second one or more selected sub-carriers, whether they are adjacently located or not.

Generally, a communication device may be configured to include a processor configured to process received OFDM or OFDMA symbols and/or frames and to generate such OFDM or OFDMA symbols and/or frames. In an example operation, the processor of the communication device is configured to select an OFDMA packet structure (e.g., from a plurality of possible OFDMA packet structures) and to generate an OFDMA packet based on that selected OFDMA packet structure and to transmit, via the communication interface, the generated OFDMA packet to at least one other communication device.

FIG. 5A is a diagram illustrating an example 501 of an OFDM and/or OFDMA packet. This packet includes at least one preamble symbol followed by at least one data symbol. The at least one preamble symbol includes information for use in identifying, classifying, and/or categorizing the packet for appropriate processing.

FIG. 5B is a diagram illustrating another example 502 of an OFDM and/or OFDMA packet. This packet also includes a preamble and data. The preamble is composed of at least one short training field (STF), at least one long training field (LTF), and at least one signal field (SIG). The data is composed of at least one data field. In both this example 502 and the prior example 501, the at least one data symbol and/or the at least one data field may generally be referred to as the payload of the packet.

Various examples are described below for possible designs of a preamble for use in wireless communications as described herein. Note that any of the various preamble designs described herein may be post-pended with at least one data field. Note also that different preamble portions may be tailored for and transmitted via different sets of sub-carriers (e.g., and/or different channels such that each channel is composed of at least one sub-carrier, such as a first channel is composed of a first sub-carrier, a second channel is composed of a second sub-carrier, etc.).

The various packet designs presented herein allow for multiplexing of legacy wireless communication devices (e.g., wireless communication devices that operate based on one or more prior or legacy IEEE 802.11 standards, protocols, and/or recommended practices) with newer wireless communication devices (e.g., wireless communication devices that operate based on one or more newer, next generation, or upgraded IEEE 802.11 standards, protocols, and/or recommended practices). For example, a legacy wireless communication device may be limited to operate based on only 20 MHz or 40 MHz basic services set (BSS) bandwidth packets and new wireless communication devices may have capability to be operative on larger, different, and/or the same BSS bandwidth. For example, such new wireless communication devices may be operative based on 40 MHz BSS bandwidth packets as shown in various example below where a 40 MHz packet in a 40 MHz basic services set (BSS) uses orthogonal frequency division multiple access (OFDMA) signaling with a legacy wireless communication device (e.g., a prior IEEE 802.11 based wireless communication device, such as one using the IEEE 802.11 ac Very High Throughput (VHT) signal field (SIG)) in a primary 20 MHz channel with a 20 MHz new user operating in a secondary 20 MHz channel within a 40 MHz BSS). The new wireless communication devices are configured to decode the OFDMA packet and find their particular information on secondary channel(s). Legacy users may be those wireless communication devices based on a prior version of IEEE 802.11 (e.g., 802.11a, 11n, 11ac, etc.) and may be restricted by their specification to operating only on primary channels (e.g., a bandwidth, channel, frequency range, etc. that is always used in communications).

FIG. 5C is a diagram illustrating an example 503 of a preamble of an OFDMA packet. This diagram is equally applicable to first legacy wireless communication devices (e.g., IEEE 802.11n users) using VHT-SIG or second legacy wireless communication devices (e.g., IEEE 802.11a users) only having L-SIG (where the prefix "L-" specifies "Legacy"). A legacy user checks the energy on all 20 MHz channels in a BSS during the L-STF [short training field (STF)] and L-LTF [long training field (LTF)] fields and based on that, the wireless communication device decides on the channel or bandwidth of the received packet. Using that channel, the Legacy user proceeds to decode the L-SIG and VHT-SIGA1 and VHT-SIGA2 by combining the signal from all 20

MHz channels in the detected channel. It is clear that while the L-SIG is repeated on all sub-channels, the VHT-SIG field is not and the Legacy user will erroneously decode it since it combines fields with different information for different users. This disclosure presents various examples and solutions for OFDMA packet design and transmission to allow wireless communication devices to classify and process such OFDMA packets appropriately. Note that while the many of the example packets are shown to be directed a legacy user and a new user (each on 20 MHz channels), note that different OFDMA packet structures can used in different examples such that any channel that is located in a lower frequency range than the available BSS channel maybe used (e.g., 20 MHz or 40 MHz out of a 80 MHz BSS, 80 MHz out of a 160 MHz BSS, etc.). Generally, any desired channel bandwidths may be selected that may be included within any communication protocol, standard, and/or recommended practice, and/or any channel bandwidths that may be not be specifically included within any such communication protocol, standard, and/or recommended practice.

FIG. 5D is a diagram illustrating another example 504 of a preamble of an OFDMA packet. In this example 504 (example A), an OFDMA packet is constructed for a second other wireless communication device (e.g., NEW user) such that fields for that second other wireless communication device start after the L-STF and L-LTF fields of fields intended for a first other wireless communication device (e.g., legacy user) thus making the first other wireless communication device determines that the packet bandwidth is only the bandwidth intended for it (e.g., via a primary 20 MHz channel in this diagram).

The L-STF and L-LTF for the Legacy user can be transmitted with the same power as that which is used for the rest of the packet (e.g., to prevent analog to digital converter (ADC) saturation) that includes the second other wireless communication device (e.g., NEW user). This will cause reduced power for the L-SIG and VHT-SIG relative to the L-LTF power for the first other wireless communication device (e.g., Legacy user). However, if they are binary phase shift keying (BPSK) modulated, then the decoding won't be affected. The second other wireless communication device (e.g., NEW user) can be designed to expect such packet where the L-STF and the L-LTF may be repeated in secondary channels 16 μsecs (micro-secs) after they are detected in the primary channel.

Figures 6A, 6B:
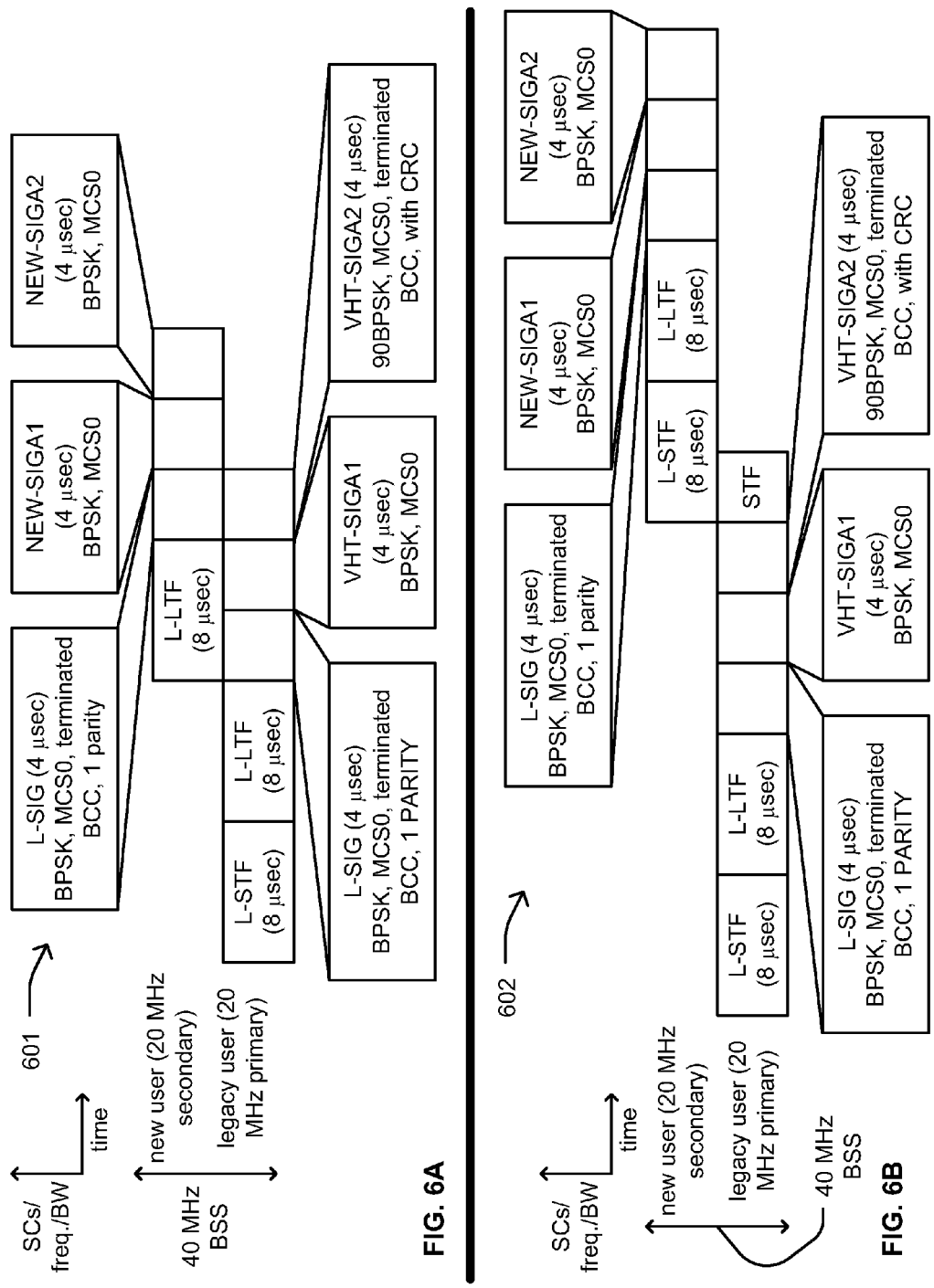
FIG. 6A is a diagram illustrating another example of a preamble of an OFDMA packet.
FIG. 6B is a diagram illustrating another example of a preamble of an OFDMA packet.

FIG. 6A is a diagram illustrating another example 601 of a preamble of an OFDMA packet. This shows another example A1 of an OFDMA packet to allow for the differentiation of portions of an OFDMA packet between new and legacy users. This example is similar to example A above except the L-STF is omitted in the secondary 20 MHz channel since the NEW user will have already acquired the initial L-STF in the primary 20 MHz channel. A NEW user is designed to expect such packet where the L-LTF may be repeated again in secondary channels 8 μsecs (micro-secs) after the primary channels. Note that at least one field in the primary 20 MHz channel is used by the second other wireless communication device (e.g., NEW user), and other fields/information in the secondary 20 MHz channel are also used by the second other wireless communication device (e.g., NEW user).

FIG. 6B is a diagram illustrating another example 602 of a preamble of an OFDMA packet. This shows another example B/B1 of an OFDMA packet to allow for the differentiation of portions of an OFDMA packet between new and legacy users. These examples are similar to examples A/A1 except that the information to NEW users starts after the VHT-SIGA2 field. A NEW user is designed to expect such packet where the L-STF (or L-LTF) may be repeated again in secondary channels 28 μsecs (micro-secs) after the primary channels.

FIG. 7A is a diagram illustrating another example 701 of a preamble of an OFDMA packet. This shows another alternative example C of an OFDMA packet to allow for the differentiation of portions of an OFDMA packet between new and legacy users. In this example C, the entire preamble up to the VHT-SIG fields (L-SIG for IEEE 802.11a users or VHT-SIG for IEEE 802.11n users) is repeated and the VHT-SIG field indicates the channel for the Legacy users (20 MHz in the diagram). Legacy users will only look and decode the packet using that channel and bandwidth value.

A NEW user is designed to expect such packet where a NEW-SIG field may arrive after the VHT-SIG field on secondary channels (and potentially also primary channels) even though the channel indication signals that the channel is located in a lower frequency range than the BSS bandwidth.

The NEW-SIG field could use phase rotation (e.g., 90 degree phase rotation with respect to at least one other field in the OFDMA packet, depicted by 90BPSK in this diagram and others), could be of any length, use any modulation or FFT size as required for NEW users in order to both convey the required information for NEW users and allow NEW users to classify the secondary channels (or the entire packet) as NEW.

FIG. 7B is a diagram illustrating another example 702 of communication between wireless communication devices. In this diagram and FIG. 7C and FIG. 7D, device 390 is implemented as a legacy wireless communication device relative and with respect to device 391 that is implemented as a newer wireless communication device (and that may be backwards compatible with the compliance of the legacy wireless communication device/device 390 that operates based on one or more prior communication protocols, standards, and/or recommended practices).

At or during a first time (time 3-1), a first at least one field of an OFDMA packet is received via a first channel such that each of devices 390 and 391 detect energy on that first channel.

FIG. 7C is a diagram illustrating another example 703 of communication between wireless communication devices. At or during a second time (time 3-2), device 390 locks onto the first channel and continues processing and monitoring only based on that first channel. Device 391 detects energy on another channel (e.g., second channel) with that is different than the first channel Device 391 then locks onto the second channel and continues processing and monitoring only based on that second channel or alternatively, locks onto both the first and second channels and continues processing and monitoring information received on both of them.

FIG. 7D is a diagram illustrating another example 704 of communication between wireless communication devices. At or during a third time (time 3-3), device 390 continues processing and monitoring only based on the first channel, and device 391 continues processing and monitoring only based on the second channel (or alternatively, locks onto both the first and second channels and continues processing and monitoring information received on both of them). At or during the third time (time 3-3), devices 390 and 391 are simultaneously receiving different respective portions of the OFDMA packet transmitted via the first and second channels.

Figures 8A, 8B:
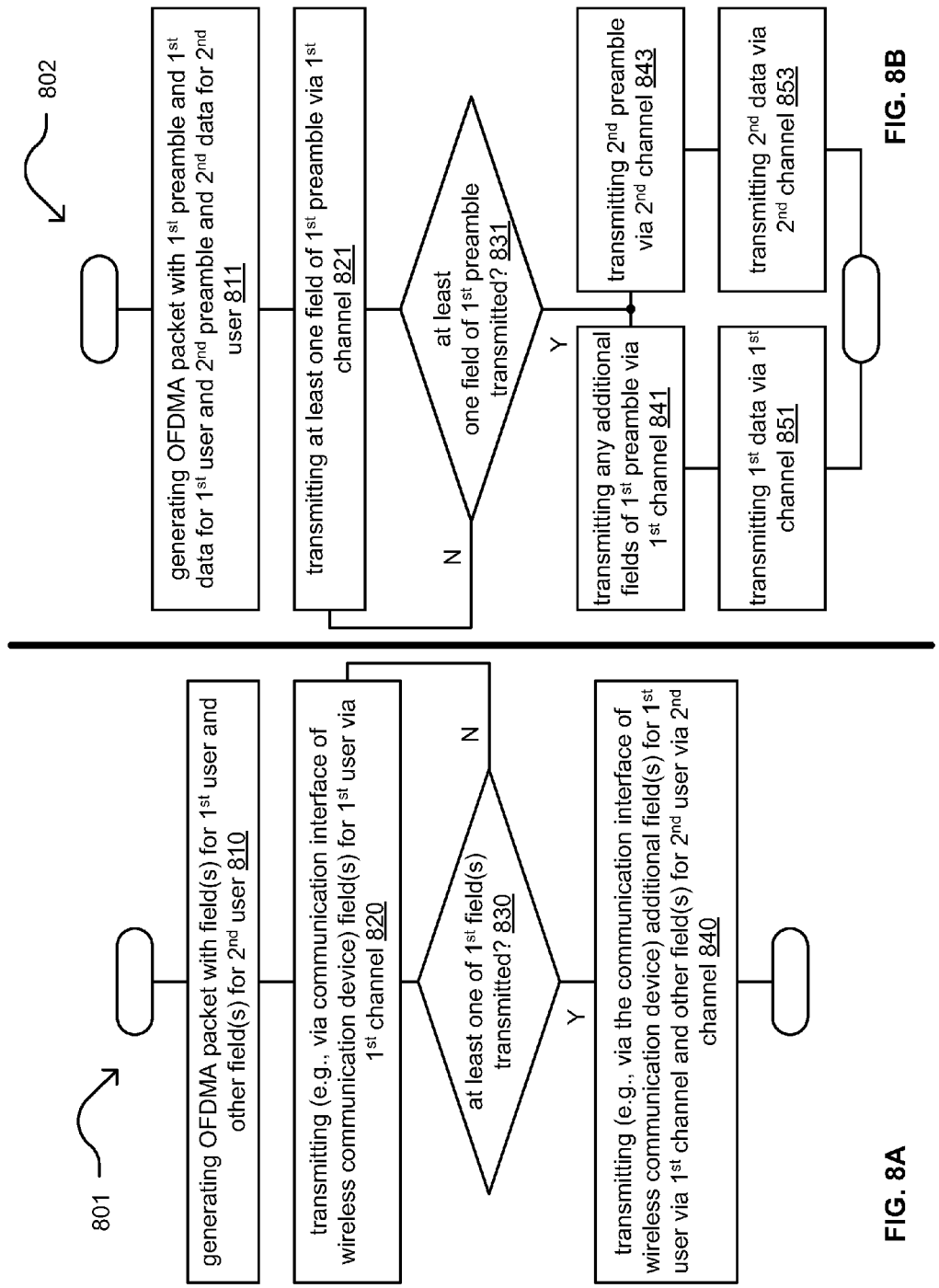
FIG. 8A is a diagram illustrating an embodiment of a method for execution by at least one wireless communication device.
FIG. 8B is a diagram illustrating an embodiment of another method for execution by at least one wireless communication device.

FIG. 8A is a diagram illustrating an embodiment of a method 801 for execution by at least one wireless communication device. The method 801 begins by generating an OFDMA packet that includes first at least one field intended for first other wireless communication device and second at least one field intended for second other wireless communication device (block 810). The method 801 continues by transmitting (e.g., via a communication interface of the wireless communication device), the first at least one field of the OFDMA packet via first channel (block 820).

When it is determined that at least one of the first fields has been transmitted (block 830), the method 801 branches and operates by transmitting (e.g., via the communication interface) the second at least one field of the OFDMA packet via second channel after at least one of the first at least one field has been transmitted while simultaneously transmitting at least one other field via the first channel Until it is determined that the at least one of the first fields has been transmitted (block 830), the method 801 branches to complete the transmission of the first at least one field of the OFDMA packet via the first channel (block 840).

FIG. 8B is a diagram illustrating an embodiment of another method 802 for execution by at least one wireless communication device. The method 802 begins by generating an OFDMA packet that includes first preamble and first data intended for first other wireless communication device and second preamble and second data intended for second other wireless communication device (block 811). The method 802 continues by transmitting at least one field of the first preamble via a first channel (block 821).

When it is determined that the at least one field of the first preamble has been transmitted via the first channel (block 831), the method 802 branches to perform simultaneous transmissions. The method 802 operates by transmitting any additional fields of the first preamble via the first channel (block 841) while also transmitting the second preamble via the second channel (block 843). The method 802 operates by transmitting the first data via the first channel (block 851) and transmitting the second data via the second channel (block 853). Note that the two branches subsequent to a favorable determination in block 831 are performed simultaneously and in parallel with one another. Note that after the at least one field of the first preamble has been transmitted, simultaneous transmissions are made via both the first and second channels.

FIG. 9A is a diagram illustrating an embodiment of a method 901 for execution by at least one wireless communication device. The method 901 begins by scanning all of a number of channels for energy (block 910). When energy is detected on a first channel (block 920), the method 901 branches and operates by locking onto and processing OFDMA packet information received on the first channel (block 930). Alternatively, if no energy is detected on the current channel being scanned (block 920), the method 901 branches to continue scanning the channels (e.g., all the other or remaining channels) for energy (block 910).

The steps associated with method 901 may be viewed as being performed by a legacy device that detects energy on a first channel, then locks onto that first channel, and continues processing information received via the first channel Such a device does not lock onto and process information received via other channels, since it will have already determined that the transmission is via the first channel. This may be achieved via the staggered transmission via the first and second channels as described herein.

FIG. 9B is a diagram illustrating an embodiment of another method 902 for execution by at least one wireless communication device. The method 902 begins by scanning all of a number of channels for energy (block 911). When energy is detected on a first channel (block 921), the method 902 branches and operates by scanning remaining channels for energy after at least one field of information has been received on the first channel (931) on which energy was detected above in the block 921. Alternatively, if no energy is detected on the current channel being scanned (block 921), the method 902 branches to continue scanning the channels for energy (e.g., all the channels or the remaining channels) (block 911).

When energy is detected on a second channel (block 941), the method 902 branches and operates by locking onto and processing OFDMA packet information received on the second channel (or both the first and second channels) (block 951). Alternatively, if no energy is detected on the current channel being scanned (block 941), the method 902 branches to continue scanning the remaining channels for energy (block 931). Note that there may be instances in which information for a given recipient device is received via both the first and second channels. There may be instances in which as few as one field (or more than one field) of information received via a first channel is intended for a recipient device, and all information received via the second channel is intended for that recipient device. In other instances, there is no information received via the first channel that is intended for the recipient device, and the only information intended for that recipient device is received via the second channel.

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
a processor, at least one of the processor or the communication interface configured to:
generate an orthogonal frequency division multiple access (OFDMA) packet that includes a first at least one field intended for a first other wireless communication device and a second at least one field intended for a second other wireless communication device;

transmit, via the communication interface, the first at least one field of the OFDMA packet via a first channel; and transmit, via the communication interface and after the first at least one field of the OFDMA packet has been transmitted via the first channel, the second at least one field of the OFDMA packet via a second channel and simultaneously transmit at least one other field of the OFDMA packet via the first channel.

2. The wireless communication device of claim 1, wherein the at least one of the processor or the communication interface is further configured to:

transmit, via the communication interface and after the first at least one field of the OFDMA packet has been transmitted via the first channel, first data for the first other wireless communication device via the first channel and simultaneously transmit second data for the second other wireless communication device via the second channel.

3. The wireless communication device of claim 1, wherein:
the first at least one field includes first short training field (STF) followed by first long training field (LTF) followed by at least one first signal field (SIG); and
the second at least one field includes second STF followed by second LTF followed by at least one second SIG.

4. The wireless communication device of claim 1, wherein:
the first at least one field includes short training field (STF) followed by first long training field (LTF) followed by at least one first signal field (SIG);
the second at least one field includes second LTF followed by at least one second SIG and excludes any STF; and
the STF is intended for both the first and second other wireless communication devices.

5. The wireless communication device of claim 1, wherein:
the first at least one field includes a first short training field (STF) followed by a first long training field (LTF) followed by a first at least one signal field (SIG);
the second at least one field includes a second STF followed by a second LTF followed by a second at least one SIG;
the first at least one SIG is based on first IEEE 802.11 communication protocol;
the second at least one SIG is based on second IEEE 802.11 communication protocol;
the first STF, the first LTF, the second STF, and the second LTF are based on a third IEEE 802.11 communication protocol that is a first legacy IEEE 802.11 communication protocol with respect to the first and the second IEEE 802.11 communication protocols; and
the first IEEE 802.11 communication protocol is a second legacy IEEE 802.11 communication protocol with respect to the second IEEE 802.11 communication protocols.

6. The wireless communication device of claim 1, wherein the first channel includes a primary channel specified by an IEEE 802.11 communication protocol, and the second channel includes a secondary channel specified by the IEEE 802.11 communication protocol.

7. The wireless communication device of claim 1 further comprising:
access point (AP), wherein at least one of the first other wireless communication device or the second other wireless communication device includes a wireless station (STA).

8. The wireless communication device of claim 1 further comprising:
access point (AP) configured to operate based on first and second IEEE 802.11 communication protocols, wherein the first other wireless communication device includes a first wireless station (STA) configured to operate based on only the first IEEE 802.11 communication protocol that is a legacy communication protocol with respect to the second IEEE 802.11 communication protocol, and wherein the second other wireless communication device includes a second STA configured to operate based on at least the second IEEE 802.11 communication protocol.

9. A wireless communication device comprising:
a communication interface; and
a processor, at least one of the processor or the communication interface configured to:
generate an orthogonal frequency division multiple access (OFDMA) packet that includes a first at least one field and first data intended for a first other wireless communication device and a second at least one field and second data intended for a second other wireless communication device;
transmit, via the communication interface, the first at least one field of the OFDMA packet via a first channel; and
transmit, via the communication interface and after the first at least one field of the OFDMA packet has been transmitted via the first channel, the second at least one field of the OFDMA packet via a second channel; and
transmit, via the communication interface and after the second at least one field of the OFDMA packet has been transmitted via the second channel, the first data intended for the first other wireless communication device via the first channel and simultaneously transmit at least a portion of the second data intended for the second other wireless communication device via the second channel.

10. The wireless communication device of claim 9, wherein:
the first at least one field includes first short training field (STF) followed by first long training field (LTF) followed by at least one first signal field (SIG); and
the second at least one field includes second STF followed by second LTF followed by at least one second SIG.

11. The wireless communication device of claim 9, wherein:
the first at least one field includes a first short training field (STF) followed by a first long training field (LTF) followed by a first at least one signal field (SIG);
the second at least one field includes a second STF followed by a second LTF followed by a second at least one SIG;
the first at least one SIG is based on first IEEE 802.11 communication protocol;
the second at least one SIG is based on second IEEE 802.11 communication protocol;
the first STF, the first LTF, the second STF, and the second LTF are based on a third IEEE 802.11 communication protocol that is a first legacy IEEE 802.11 communication protocol with respect to the first and the second IEEE 802.11 communication protocols; and
the first IEEE 802.11 communication protocol is a second legacy IEEE 802.11 communication protocol with respect to the second IEEE 802.11 communication protocols.

12. The wireless communication device of claim 9, wherein the first channel includes a primary channel specified by an IEEE 802.11 communication protocol, and the second channel includes a secondary channel specified by the IEEE 802.11 communication protocol.

13. The wireless communication device of claim 9 further comprising:
access point (AP) configured to operate based on first and second IEEE 802.11 communication protocols, wherein the first other wireless communication device includes a first wireless station (STA) configured to operate based on only the first IEEE 802.11 communication protocol that is a legacy communication protocol with respect to the second IEEE 802.11 communication protocol, and wherein the second other wireless communication device includes a second STA configured to operate based on at least the second IEEE 802.11 communication protocol.

14. A method for execution by a wireless communication device, the method comprising:
generating an orthogonal frequency division multiple access (OFDMA) packet that includes a first at least one field intended for a first other wireless communication device and a second at least one field intended for a second other wireless communication device;
transmitting, via a communication interface of the wireless communication device, the first at least one field of the OFDMA packet via a first channel; and
transmitting, via the communication interface and after the first at least one field has been transmitted via the first channel, the second at least one field of the OFDMA packet via a second channel while simultaneously transmitting at least one other field via the first channel.

15. The method of claim 14 further comprising:
transmitting, via the communication interface and after the first at least one field of the OFDMA packet has been transmitted via the first channel, first data for the first other wireless communication device via the first channel while simultaneously transmitting second data for the second other wireless communication device via the second channel.

16. The method of claim 14, wherein:
the first at least one field includes first short training field (STF) followed by first long training field (LTF) followed by at least one first signal field (SIG); and
the second at least one field includes second STF followed by second LTF followed by at least one second SIG.

17. The method of claim 14, wherein:
the first at least one field includes short training field (STF) followed by first long training field (LTF) followed by at least one first signal field (SIG);
the second at least one field includes second LTF followed by at least one second SIG and excludes any STF; and
the STF is intended for both the first and second other wireless communication devices.

18. The method of claim 14, wherein:
the first at least one field includes a first short training field (STF) followed by a first long training field (LTF) followed by a first at least one signal field (SIG);
the second at least one field includes a second STF followed by a second LTF followed by a second at least one SIG;
the first at least one SIG is based on first IEEE 802.11 communication protocol;
the second at least one SIG is based on second IEEE 802.11 communication protocol;
the first STF, the first LTF, the second STF, and the second LTF are based on a third IEEE 802.11 communication protocol that is a first legacy IEEE 802.11 communication protocol with respect to the first and the second IEEE 802.11 communication protocols; and
the first IEEE 802.11 communication protocol is a second legacy IEEE 802.11 communication protocol with respect to the second IEEE 802.11 communication protocols.

19. The method of claim 14, wherein the first channel includes a primary channel specified by an IEEE 802.11 communication protocol, and the second channel includes a secondary channel specified by the IEEE 802.11 communication protocol.

20. The method of claim 14, wherein the wireless communication device is an access point (AP) configured to operate based on first and second IEEE 802.11 communication protocols, wherein the first other wireless communication device includes a first wireless station (STA) configured to operate based on only the first IEEE 802.11 communication protocol that is a legacy communication protocol with respect to the second IEEE 802.11 communication protocol, and wherein the second other wireless communication device includes a second STA configured to operate based on at least the second IEEE 802.11 communication protocol.

* * * * *